United States Patent
Nagatani et al.

(10) Patent No.: US 10,173,714 B2
(45) Date of Patent: Jan. 8, 2019

(54) STEERING SYSTEM

(71) Applicant: JTEKT CORPORATION, Osaka-shi, Osaka (JP)

(72) Inventors: Atsumune Nagatani, Kashihara (JP); Yu Myohoji, Habikino (JP)

(73) Assignee: JTEKT CORPORATION, Osaka-shi (JP)

( * ) Notice: Subject to any disclaimer, the term of this patent is extended or adjusted under 35 U.S.C. 154(b) by 79 days.

(21) Appl. No.: 15/615,300

(22) Filed: Jun. 6, 2017

(65) Prior Publication Data
US 2017/0355392 A1    Dec. 14, 2017

(30) Foreign Application Priority Data

Jun. 14, 2016  (JP) ................. 2016-118215

(51) Int. Cl.
*B62D 1/184* (2006.01)
*B62D 1/19* (2006.01)
*F16B 7/10* (2006.01)

(52) U.S. Cl.
CPC ............. *B62D 1/184* (2013.01); *B62D 1/195* (2013.01); *F16B 7/10* (2013.01)

(58) Field of Classification Search
CPC ........... B62D 1/184; B62D 1/19; B62D 1/195
See application file for complete search history.

(56) References Cited

U.S. PATENT DOCUMENTS

| 2011/0185839 A1 | 8/2011 | Inoue | |
| 2016/0288820 A1* | 10/2016 | Myohoji | B62D 1/195 |

FOREIGN PATENT DOCUMENTS

| DE | 3914608 C1 * | 10/1990 | ............ B62D 1/184 |
| DE | 10 2010 044 795 A1 | 3/2012 | |
| EP | 3 075 630 A1 | 10/2016 | |
| JP | 2010-254204 A | 11/2010 | |

OTHER PUBLICATIONS

Dec. 15, 2017 Search Report issued in European Patent Application No. 17175279.3.

* cited by examiner

*Primary Examiner* — Karen Beck
(74) *Attorney, Agent, or Firm* — Oliff PLC

(57) ABSTRACT

First teeth of a first tooth member that moves together with an upper jacket mesh with second teeth of a second tooth member. The second tooth member includes a received portion received by a receiving surface of a receiving member (energy absorption member). The second tooth member is rotatably supported by a fulcrum that is formed on the receiving surface at a contact position between the receiving surface and the received portion and is movable in a column axis direction. A guide shaft supported by a support member that is supported by a lower jacket is inserted into an elongated hole of the second tooth member, thereby guiding the second tooth member in a meshing and unmeshing direction.

8 Claims, 13 Drawing Sheets

STEERING SYSTEM

INCORPORATION BY REFERENCE

The disclosure of Japanese Patent Application No. 2016-118215 filed on Jun. 14, 2016 including the specification, drawings and abstract, is incorporated herein by reference in its entirety.

BACKGROUND OF THE INVENTION

1. Field of the Invention

The present invention relates to a steering system.

2. Description of the Related Art

In a steering system of Japanese Patent Application Publication No. 2010-254204 (JP 2010-254204 A), an undulating concavo-convex portion is provided on the outer periphery of an eccentric cam configured to rotate about a support shaft along with an operation of an adjustment lever. The undulating concavo-convex portion is pressed against the upper surface of an inner column to achieve a telescopic lock.

In JP 2010-254204 A, the support shaft that is a pivot center shaft of the eccentric cam needs to be inserted into through holes of a pair of protruding portions of an outer column and into a through hole of the eccentric cam. Therefore, assembling workability is poor.

SUMMARY OF THE INVENTION

It is one object of the present invention to provide a steering system having excellent assembling workability.

A steering system according to one aspect of the present invention has the following features in its structure. That is, the steering system includes a steering shaft, a column jacket, a first tooth member, a receiving member, a second tooth member, a support member, and a guide mechanism. The steering shaft is extensible and contractible in a column axis direction. The column jacket includes a lower jacket and an upper jacket fitted to the lower jacket. The column jacket supports the steering shaft such that the steering shaft is rotatable and is extensible and contractible in the column axis direction. The first tooth member has a plurality of first teeth arrayed in the column axis direction and is movable together with the upper jacket. The receiving member is provided on one of the upper jacket and the lower jacket and has a receiving surface. The second tooth member includes a received portion received by the receiving surface, and second teeth spaced away from the received portion and configured to achieve a telescopic lock by meshing with the first teeth. The second tooth member is rotatably supported by a fulcrum that is formed on the receiving surface at a contact position between the receiving surface and the received portion and that is movable in the column axis direction. The support member is supported by the lower jacket. The guide mechanism includes a guide shaft supported by the support member and extending in a direction orthogonal to the column axis direction, and an elongated hole formed in the second tooth member with the guide shaft inserted into the elongated hole. The guide mechanism is configured to guide the second tooth member in a meshing and unmeshing direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 10A and 10B are partially cutaway side views of the structure around the tooth lock mechanism according to the first embodiment, in which FIG. 10A illustrates a locked state and FIG. 10B illustrates an unlocked state;

DETAILED DESCRIPTION OF EMBODIMENTS

Figure 1:
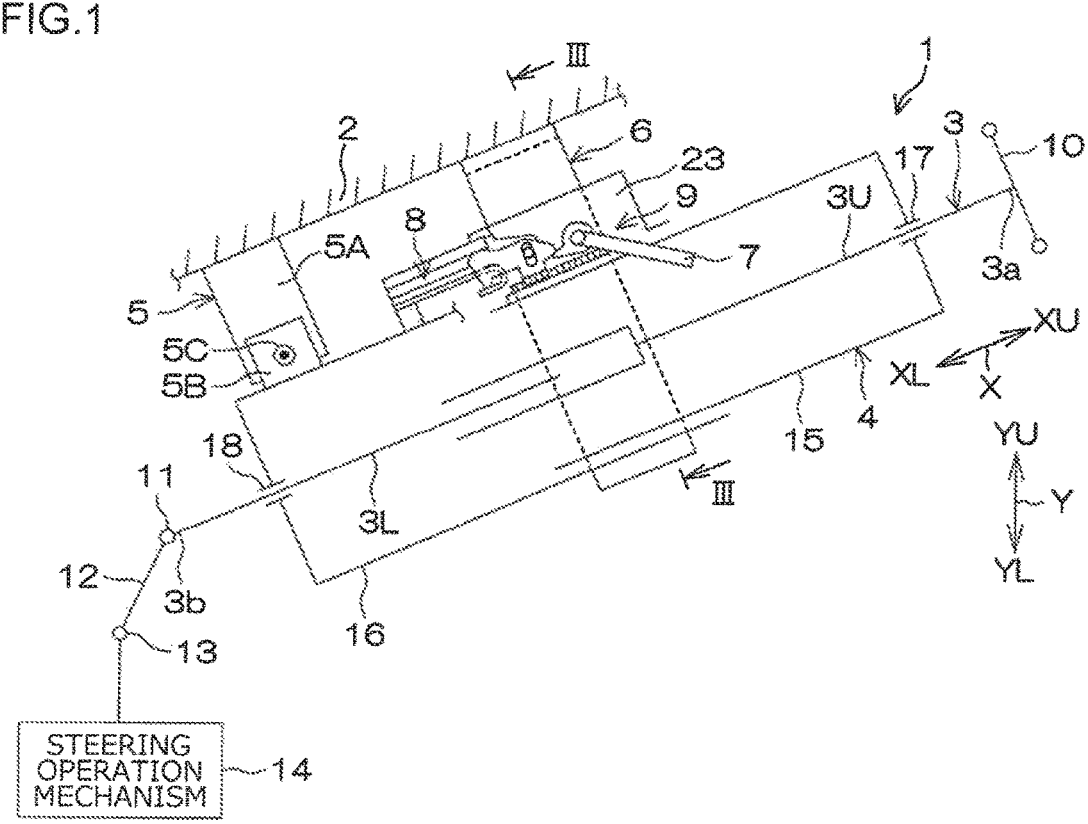
FIG. 1 is a schematic side view of a steering system according to a first embodiment of the present invention.
Figure 2:
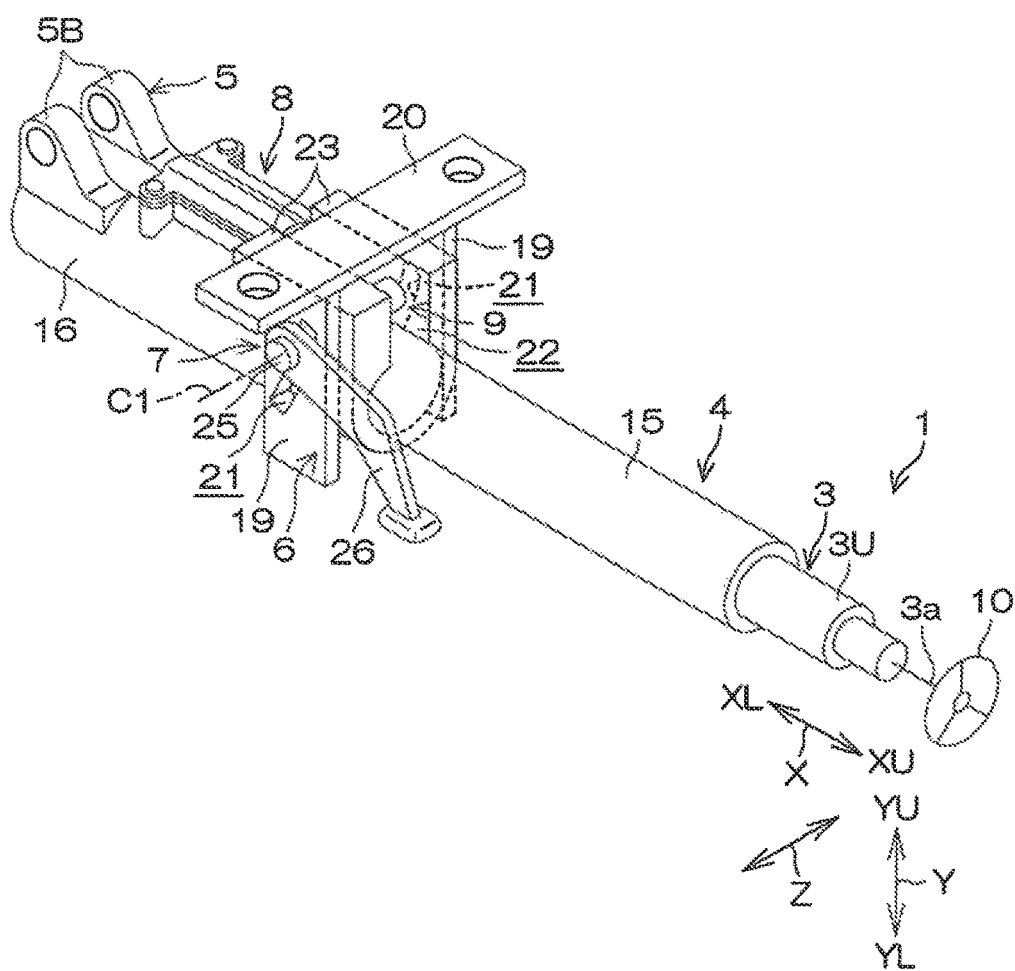
FIG. 2 is a schematic perspective view of the steering system of the first embodiment.

Specific embodiments of the present invention are described below with reference to the drawings. FIG. 1 is a schematic side view of a steering system 1 according to one embodiment of the present invention. In FIG. 1, the left side of the drawing sheet is a front side of a vehicle body 2 to which the steering system 1 is mounted, and the right side of the drawing sheet is a rear side of the vehicle body 2. In FIG. 1, the upper side of the drawing sheet is an upper side of the vehicle body 2, and the lower side of the drawing sheet is a lower side of the vehicle body 2. FIG. 2 is a perspective view of the steering system 1.

Referring to FIG. 1, the steering system 1 mainly includes a steering shaft 3, a column jacket 4, a lower bracket 5, an upper bracket 6, a tightening mechanism 7, an energy absorption mechanism 8, and a tooth lock mechanism 9. The direction in which the steering shaft 3 extends is a column axis direction X. A steering member 10 such as a steering wheel is coupled to one end 3a of the steering shaft 3 (upper end in the column axis direction X). A steering operation mechanism 14 is coupled to the other end 3b of the steering shaft 3 (lower end in the column axis direction X) sequentially via a universal joint 11, an intermediate shaft 12, and a universal joint 13. The steering operation mechanism 14 is, for example, a rack and pinion mechanism configured to turn steered wheels (not illustrated) in response to transmission of steering rotation of the steering member 10.

The steering shaft 3 includes a tubular upper shaft 3U and a lower shaft 3L. The upper shaft 3U is fitted to the lower shaft 3L in a relatively slidable manner by, for example, spline fitting or serration fitting. The steering member 10 is coupled to one end of the upper shaft 3U (upper end in the column axis direction X). Through movement of the upper shaft 3U in the column axis direction X relative to the lower shaft 3L, the steering shaft 3 is extensible and contractible in the column axis direction X. The upper side and the lower side in the column axis direction X are herein referred to as a column axis direction upper side XU and a column axis direction lower side XL, respectively.

The column jacket 4 is a hollow member extending in the column axis direction X. The column jacket 4 includes an upper jacket 15 and a lower jacket 16. The upper jacket 15 is fitted into the lower jacket 16 so as to be slidable in the column axis direction X. The column jacket 4 is extensible and contractible in the column axis direction X. The steering shaft 3 is inserted into the column jacket 4, and is rotatably supported by the column jacket 4 via a plurality of bearings 17 and 18. Specifically, the upper jacket 15 rotatably supports the upper shaft 3U via the bearing 17. The lower jacket 16 rotatably supports the lower shaft 3L via the bearing 18.

The upper jacket 15 is coupled to the upper shaft 3U via the bearing 17. The lower jacket 16 is coupled to the lower shaft 3L via the bearing 18. Therefore, the upper jacket 15 moves in the column axis direction X relative to the lower jacket 16, so that the column jacket 4 extends and contracts in the column axis direction X together with the steering shaft 3.

The extension and contraction of the steering shaft 3 and the column jacket 4 are herein referred to as "telescopic motion". Positional adjustment of the steering member 10 in the column axis direction X through the telescopic motion is referred to as telescopic adjustment. The lower bracket 5 includes a fixed bracket 5A and a movable bracket 5B. The fixed bracket 5A is fixed to the vehicle body 2. The movable bracket 5B is fixed to a lower part of the lower jacket 16 in the column axis direction X. The movable bracket 5B is rotatably supported via a center shaft 5C extending in a direction (lateral direction of the vehicle body 2, which is a direction orthogonal to the drawing sheet in FIG. 1) orthogonal to the column axis direction X.

The column jacket 4 and the steering shaft 3 are vertically pivotable about the center shaft 5C. The pivot motion is herein referred to as "tilt". The direction of substantially vertical movement about the center shaft 5C is referred to as a tilt direction Y Vertical adjustment of the steering member 10 through the tilt is referred to as tilt adjustment. The upper side in the tilt direction Y is referred to as a tilt direction upper side YU, and the lower side in the tilt direction Y is referred to as a tilt direction lower side YL.

As illustrated in FIG. 2, a direction orthogonal to both of the column axis direction X and the tilt direction corresponds to a lateral direction Z of the vehicle body 2. The upper bracket 6 includes a pair of side plates 19 and a coupling plate 20. The pair of side plates 19 face each other in the lateral direction Z across the column jacket 4. The coupling plate 20 couples the upper ends of the pair of side plates 19 to each other. The upper bracket 6 as a whole has a shape of a groove that is open downward when viewed in the column axis direction X. The coupling plate 20 has portions extending laterally outward over the pair of side plates 19. The coupling plate 20 is fixed to the vehicle body 2 (see FIG. 1) with bolts (not illustrated) inserted into those portions. In this manner, the upper bracket 6 is fixed to the vehicle body 2.

As illustrated in FIG. 2, tilt grooves 21 are formed in the pair of side plates 19. Each of the tilt grooves 21 has a shape of an arc formed about the tilt center shaft 5C. The lower jacket 16 includes a slit 22 extending in the column axis direction X, and a pair of tightened portions 23 arranged on both sides of the slit 22. The slit 22 is formed at a part of the lower jacket 16 on the column axis direction upper side XU. The pair of tightened portions 23 are plate-like portions facing each other in the lateral direction Z across the slit 22 at parts of the lower jacket 16 on the column axis direction upper side XU. By clamping and tightening the pair of tightened portions 23, the lower jacket 16 that is elastically reduced in diameter tightens the upper jacket 15.

Figure 3:
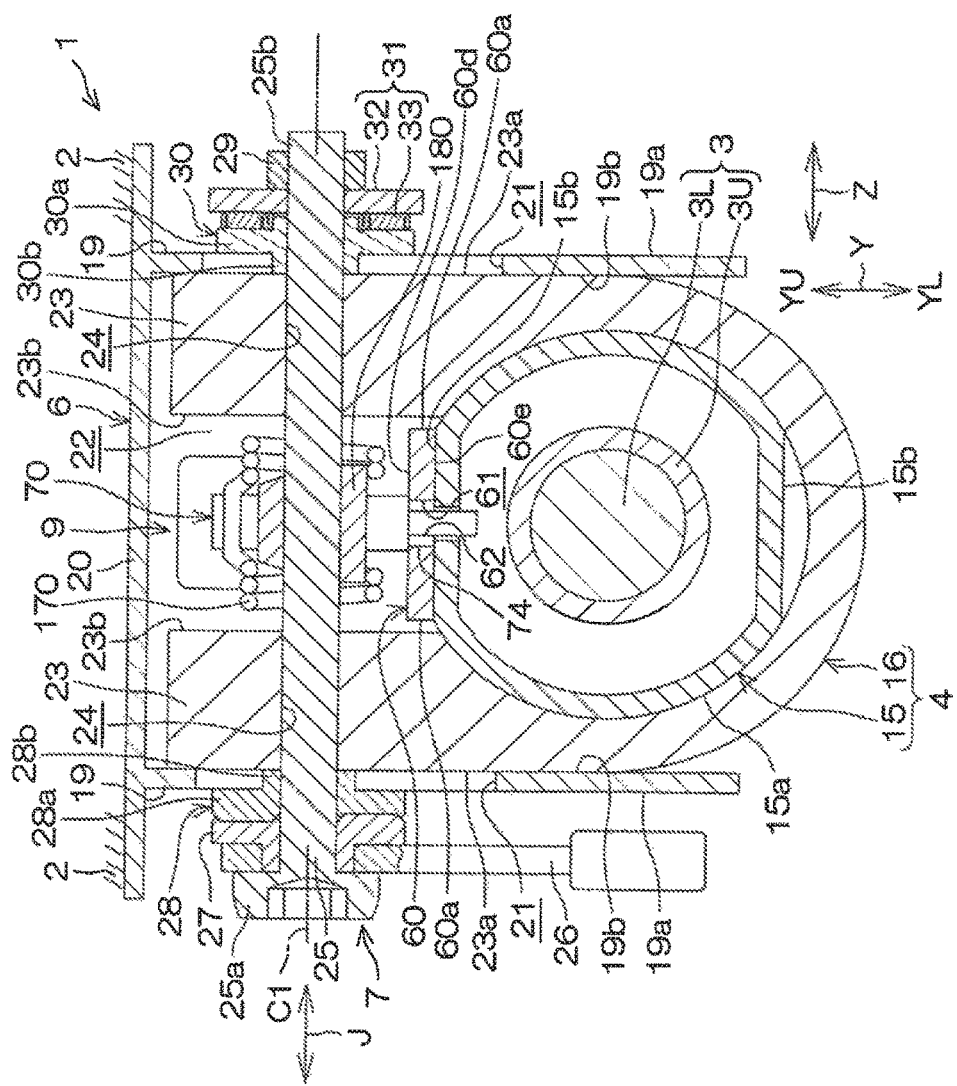
FIG. 3 is a sectional view taken along the line III-III of FIG. 1.

FIG. 3 is a sectional view taken along the line III-III of FIG. 1. As illustrated in FIG. 3, each of the pair of side plates 19 of the upper bracket 6 has an outer side surface 19a and an inner side surface 19b. A shaft insertion hole 24 is formed in each of the pair of tightened portions 23. The shaft insertion hole 24 is a circular hole passing through the tightened portion 23 in the lateral direction Z. Each of the pair of plate-like tightened portions 23 has an outer side surface 23a and an inner side surface 23b. The outer side surface 23a of each tightened portion 23 faces the inner side surface 19b of the corresponding side plate 19 of the upper bracket 6.

At circumferential parts of an outer peripheral surface 15a of the upper jacket 15, a pair of flat portions 15b extending parallel to each other are provided in a predetermined range in the column axis direction X (direction orthogonal to the drawing sheet in FIG. 3). A plate-like first tooth member 60 of the tooth lock mechanism 9 is fixed to one flat portion 15b. End faces 60a on both sides (in the lateral direction Z) of the first tooth member 60 closely face the inner side surfaces 23b of the pair of tightened portions 23, respectively.

At the time of telescopic adjustment, the inner side surfaces 23b of the pair of tightened portions 23 restrict rotation of the upper jacket 15 relative to the lower jacket 16 while guiding movement of the upper jacket 15 in the column axis direction X via the pair of end faces 60a of the first tooth member 60. Next, the tightening mechanism 7 is described. The tightening mechanism 7 is a mechanism for locking or unlocking the position of the steering member 10 (see FIG. 1) subjected to the tilt adjustment and the telescopic adjustment.

The tightening mechanism 7 includes a tightening shaft 25, an operation lever 26, a ring-like cam 27, one tightening member 28 serving as a ring-like cam follower, a nut 29, the other tightening member 30, and an interposed member 31. The cam 27, the one tightening member 28, the nut 29, the other tightening member 30, and the interposed member 31 are supported on the outer periphery of the tightening shaft 25. The tightening shaft 25 is formed of a bolt inserted into the tilt grooves 21 of both the side plates 19 of the upper bracket 6 and the shaft insertion holes 24 of both the tightened portions 23 of the lower jacket 16. The tightening shaft 25 is supported by both the side plates 19. A large-diameter head portion 25a provided at one end of the tightening shaft 25 is fixed to the operation lever 26 so as to be rotatable together with the operation lever 26.

The cam 27 and the cam follower (one tightening member 28) are interposed between the head portion 25a of the tightening shaft 25 and one side plate 19 to constitute a force conversion mechanism configured to convert operation torque of the operation lever 26 to an axial force of the tightening shaft 25 (tightening force for tightening the pair of side plates 19). The cam 27 is coupled to the operation lever 26 so as to be rotatable together with the operation lever 26, thereby restricting movement of the cam 27 relative to the tightening shaft 25 in a tightening axis direction J that is a central axis direction of the tightening shaft 25. The cam follower (one tightening member 28) engages with the cam 27 to tighten the one side plate 19.

The one tightening member 28 (cam follower) and the other tightening member 30 include tightening plate portions 28a and 30a, respectively, configured to tighten the corresponding side plates 19, and also include boss portions 28b and 30b, respectively, fitted to the corresponding tilt grooves 21. By fitting the boss portions 28b and 30b to the corresponding tilt grooves 21, rotation of the tightening members 28 and 30 is restricted. Further, both the tightening members 28 and 30 are supported by the tightening shaft 25 so as to be movable in the tightening axis direction J.

The nut 29 engages with a thread portion 25b at the other end of the tightening shaft 25. The interposed member 31 is interposed between the other tightening member 30 and the nut 29. The interposed member 31 includes a washer 32 and a needle roller bearing 33. Along with locking rotation of the operation lever 26, the cam 27 rotates relative to the one tightening member 28 (cam follower). Thus, the one tightening member 28 moves in the tightening axis direction J. The pair of side plates 19 of the upper bracket 6 are clamped and tightened between the tightening members 28 and 30 (tightening plate portions 28a and 30a of the tightening members 28 and 30).

Thus, the side plates 19 of the upper bracket 6 tighten the corresponding tightened portions 23 of the lower jacket 16. As a result, movement of the lower jacket 16 in the tilt direction Y is restricted by frictional engagement forces between the side plates 19 and the corresponding tightened portions 23, thereby achieving a tilt lock. When both the tightened portions 23 are tightened, a part of the lower jacket 16 on the column axis direction upper side XU tightens the upper jacket 15. As a result, movement of the upper jacket 15 in the column axis direction X is restricted by a frictional engagement force between the jackets 15 and 16, thereby achieving a telescopic lock.

Figure 4:
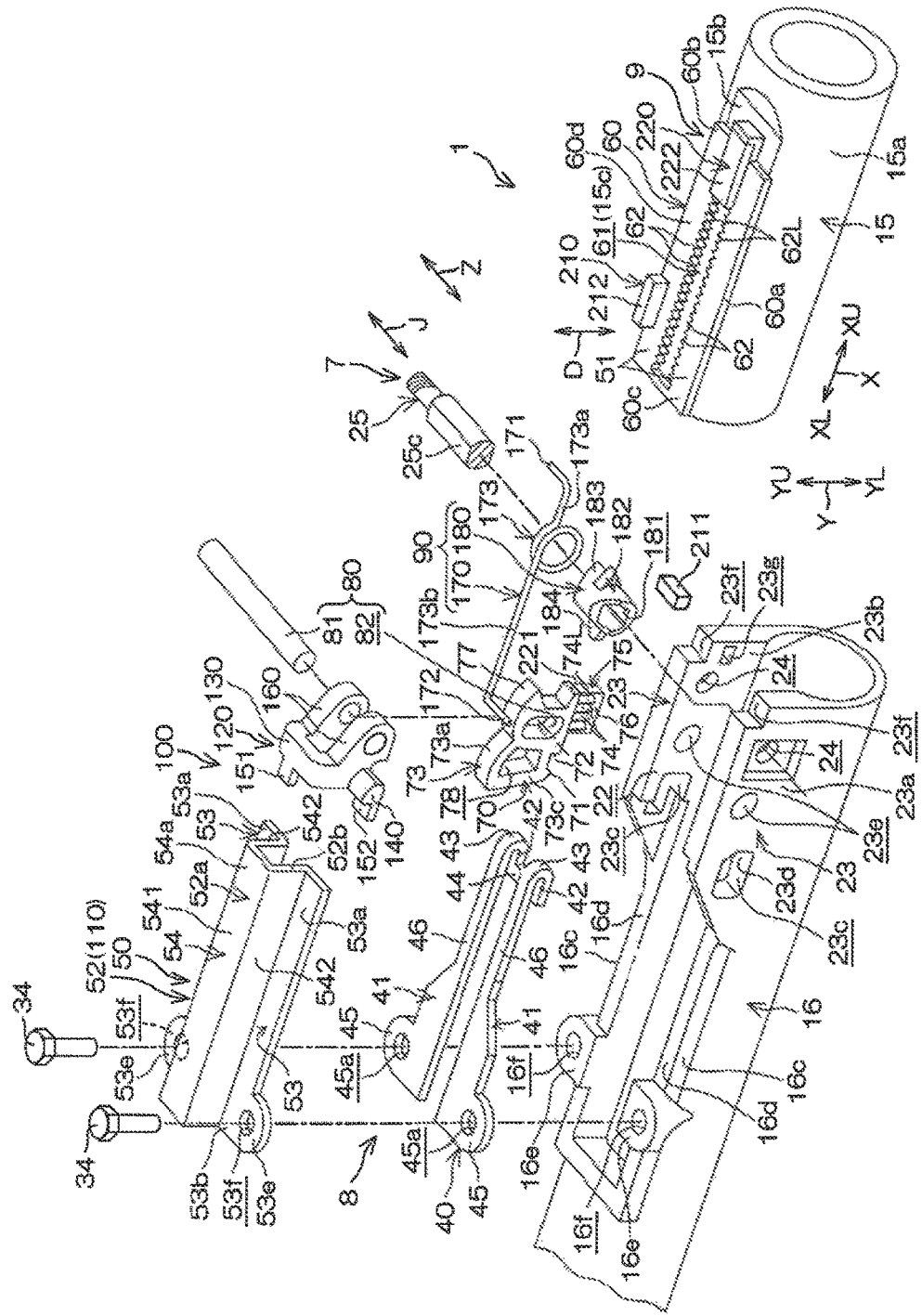
FIG. 4 is an exploded perspective view of the steering system of the first embodiment, mainly illustrating the structures of an energy absorption mechanism and a tooth lock mechanism.

FIG. 4 is a schematic exploded perspective view of the energy absorption mechanism 8 and the tooth lock mechanism 9. As illustrated in FIG. 4, the energy absorption mechanism 8 includes an energy absorption member 40 and a guide and restriction mechanism 50. The energy absorption member 40 moves and deforms upon a secondary collision. The guide and restriction mechanism 50 guides and restricts the movement and deformation of the energy absorption member 40. The energy absorption member 40 includes a pair of first plate portions 41, a pair of second plate portions 42, a pair of folded portions 43, and a movement portion 44. The pair of first plate portions 41 include fixed portions 45 and deformable portions 46.

The pair of first plate portions 41 of the energy absorption member 40 are coupled to the corresponding second plate portions 42 via the corresponding folded portions 43. The movement portion 44 functions as a coupling portion that couples the lower ends of the second plate portions 42 in the column axis direction X to each other. Upon a secondary collision, the movement portion 44 that functions as the coupling portion moves to the column axis direction lower side XL together with the upper jacket 15. The tooth lock mechanism 9 includes the first tooth member 60, a second tooth member 70, a guide mechanism 80, and an interlock mechanism 90. The first tooth member 60 is fixed to the upper jacket 15. The second tooth member 70 engages with the first tooth member 60. The guide mechanism 80 guides the second tooth member 70. The interlock mechanism 90 associates motion of the second tooth member 70 with rotation of the tightening shaft 25.

The guide and restriction mechanism 50 of the energy absorption mechanism 8 includes a pair of guide and restriction surfaces 51 and a guide and restriction member 52. The pair of guide and restriction surfaces 51 are provided on the first tooth member 60, and closely face the pair of second plate portions 42 in the tilt direction Y. The pair of guide and restriction surfaces 51 on the first tooth member 60 extend parallel to the column axis direction X. Upon a secondary collision, the pair of guide and restriction surfaces 51 receive the second plate portions 42 that move together with the movement portion 44, thereby guiding translation of the second plate portions 42 to the column axis direction lower side XL relative to the first plate portions 41. In other words, the pair of guide and restriction surfaces 51 guide the movement of the movement portion 44 to the column axis direction lower side XL while the second plate portions 42, which have lengths in the column axis direction X to be increased upon a secondary collision, are kept parallel to the first plate portions 41.

Figure 5:
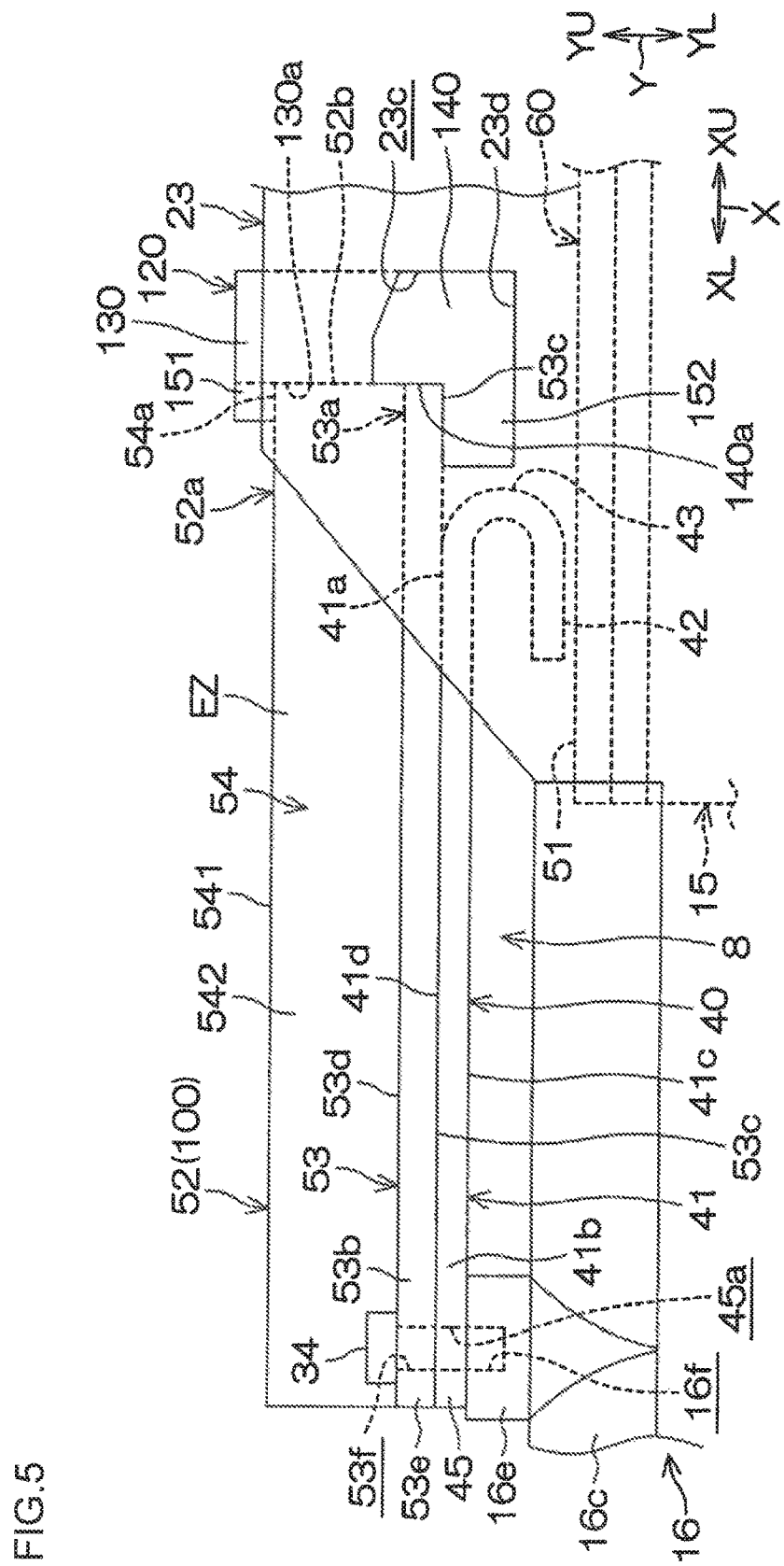
FIG. 5 is a side view of a main part of the steering system of the first embodiment, mainly illustrating a structure for supporting the energy absorption mechanism.

The guide and restriction member 52 includes a pair of guide and restriction plates 53 and a coupling portion 54. The coupling portion 54 includes an upper plate 541 and a pair of side plates 542 so as to have a shape of a groove that is open downward. The pair of guide and restriction plates 53 extend laterally outward (in the lateral direction Z) from a pair of open ends of the coupling portion 54 having a groove shape. FIG. 5 is a side view of a main part of the steering system 1, mainly illustrating a structure for supporting the energy absorption mechanism 8. As illustrated in FIG. 4 and FIG. 5, the pair of guide and restriction plates 53 of the guide and restriction member 52 are arranged parallel to the corresponding guide and restriction surfaces 51. Each of the pair of guide and restriction plates 53 is arranged so as to cover the corresponding first plate portion 41 of the energy absorption member 40 from its outer side.

Each guide and restriction plate 53 has an upper end 53a and a lower end 53b in the column axis direction X. As illustrated in FIG. 5, each guide and restriction plate 53 has an inner surface 53c, which is a surface located on the lower jacket 16 side (energy absorption member 40 side), and an outer surface 53d. As illustrated in FIG. 4, a fixed portion 53e projecting laterally outward is formed at the lower end 53b of each guide and restriction plate 53. A screw insertion hole 53f is formed in each fixed portion 53e.

The pair of first plate portions 41 of the energy absorption member 40 are coupled to the corresponding second plate portions 42 via the corresponding folded portions 43. The movement portion 44 (coupling portion) extends in the lateral direction Z so as to couple the lower ends of the second plate portions 42 in the column axis direction X to each other. Upon a secondary collision, the movement portion 44 moves to the column axis direction lower side XL together with the upper jacket 15. The pair of first plate portions 41 extend parallel to the column axis direction X. The pair of first plate portions 41 are spaced away from each other in the lateral direction Z. The pair of second plate portions 42 extend parallel to the column axis direction X. The pair of second plate portions 42 are spaced away from each other in the lateral direction Z. Each first plate portion 41 and the corresponding second plate portion 42 are spaced away from each other in the tilt direction Y.

Figure 6:
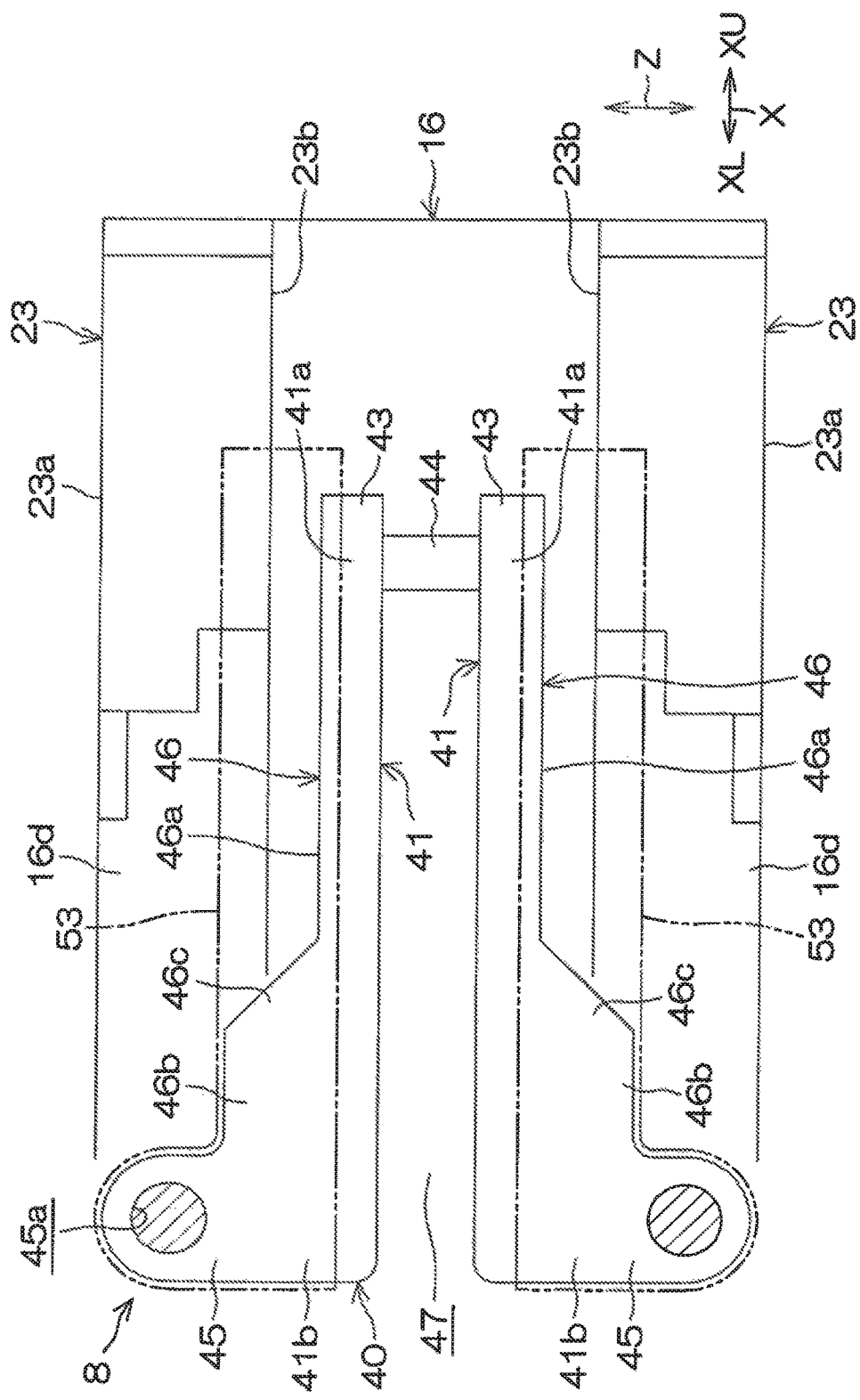
FIG. 6 is a schematic plan view of an energy absorption member and a lower jacket according to the first embodiment.

FIG. 6 is a schematic plan view of the energy absorption member 40 and the lower jacket 16. As illustrated in FIG. 5 and FIG. 6, each first plate portion 41 has an upper end 41a and a lower end 41b in the column axis direction X. As illustrated in FIG. 5, each first plate portion 41 has an inner surface 41c and an outer surface 41d. As illustrated in FIG. 6, the fixed portion 45 projecting laterally outward is provided at the lower end 41b of each first plate portion 41. A screw insertion hole 45a is formed in each fixed portion 45.

As illustrated in FIG. 4, the lower jacket 16 includes a pair of wall portions 16c on both sides of the slit 22 and on the column axis direction lower side XL with respect to the pair of tightened portions 23. The pair of wall portions 16c extend parallel to the column axis direction X and protrude to the tilt direction upper side YU. In the tilt direction Y, the height of the pair of wall portions 16c is set smaller than the height of the pair of tightened portions 23. The lower jacket 16 includes a pair of fixing portions 16e formed of bosses protruding from upper surfaces 16d (surfaces on the tilt direction upper side YU) of the pair of wall portions 16c. A screw hole 16f is formed in each fixing portion 16e.

As illustrated in FIG. 5, fixing members 34 formed of a pair of fixing screws are each inserted into the screw insertion hole 53f of the fixed portion 53e of the corresponding guide and restriction plate 53 of the guide and restriction member 52 and the screw insertion hole 45a of the fixed portion 45 of the first plate portion 41 of the energy absorption member 40 and driven into the screw hole 16f of the fixing portion 16e of the lower jacket 16. That is, the fixed portion 53e at the lower end 53b of each guide and restriction plate 53 in the column axis direction X together with the fixed portion 45 at the lower end 41b of the corresponding first plate portion 41 of the energy absorption member 40 in the column axis direction X are fastened to the lower jacket 16.

As illustrated in FIG. 6, each first plate portion 41 includes the deformable portion 46 extending from the upper end 41a to the column axis direction lower side XL. Regarding the width of the deformable portion 46 in the lateral direction Z, the deformable portion 46 includes a narrow portion 46a, a wide portion 46b, and a width changing portion 46c. The narrow portion 46a adjoins the upper end 41a and has a constant width. The wide portion 46b adjoins the lower end 41b and has a constant width larger than that of the narrow portion 46a. The width changing portion 46c is interposed between the narrow portion 46a and the wide portion 46b and has a width gradually increasing toward the wide portion 46b.

A slit 47 extending in the column axis direction X is formed between the pair of first plate portions 41 in the lateral direction Z. Each guide and restriction plate 53 is arranged so as to cover the corresponding first plate portion 41. Upon a secondary collision, the guide and restriction plate 53 restricts movement of the first plate portion 41 to the tilt direction upper side YU. In this embodiment, the width changing portion 46c is folded to deform at a terminal end of a shock absorption stroke of the upper jacket 15 upon a secondary collision, thereby increasing a shock absorption load. In this embodiment, the narrow portion 46a and the width changing portion 46c are folded to deform upon a secondary collision, but the wide portion 46b may be folded to deform as well. That is, energy absorption characteristics of the energy absorption member 40 upon a secondary collision are changeable in accordance with the setting of the lengths of the narrow portion 46a, the wide portion 46b, and the width changing portion 46c in the column axis direction X.

Figure 7:
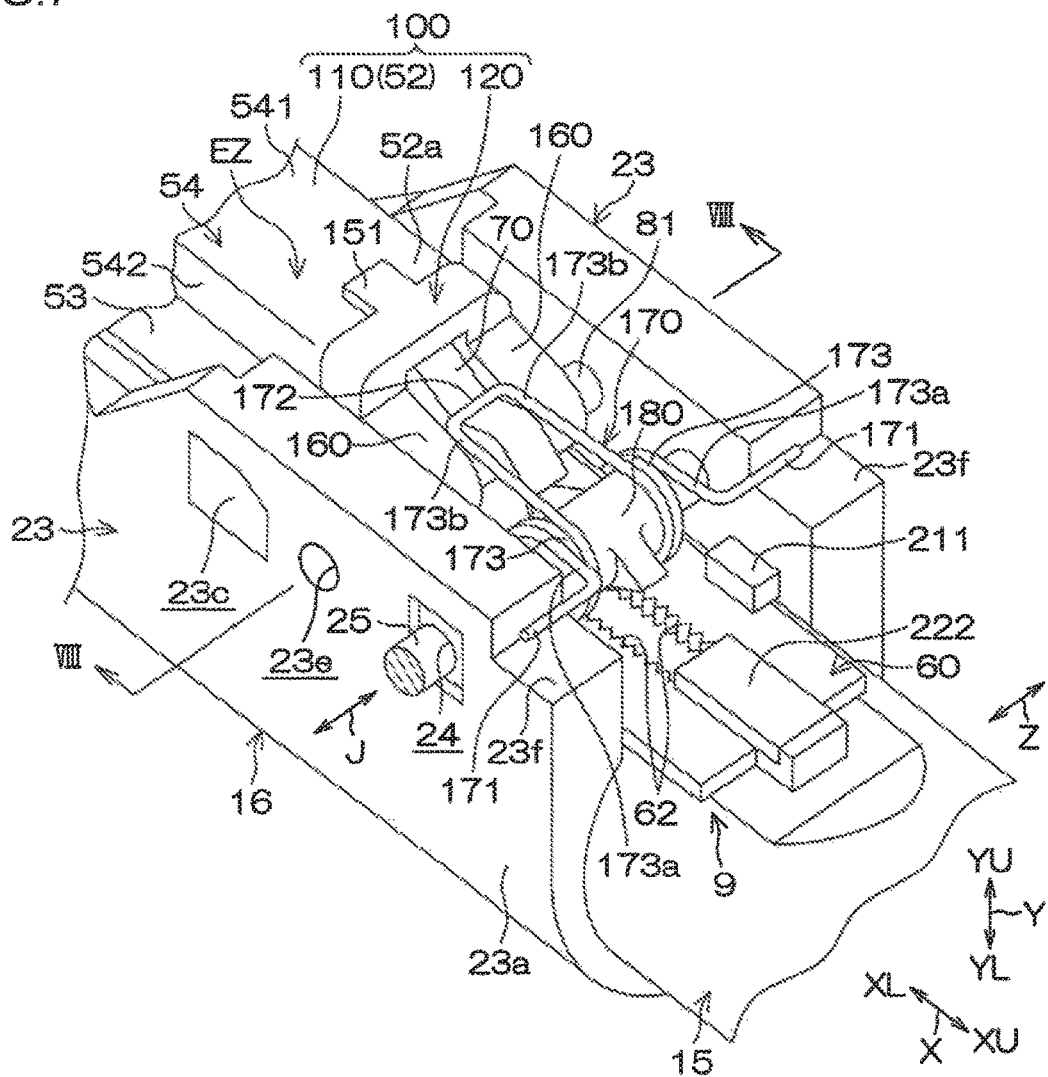
FIG. 7 is a perspective view of the structure around the tooth lock mechanism according to the first embodiment.
Figure 10A:
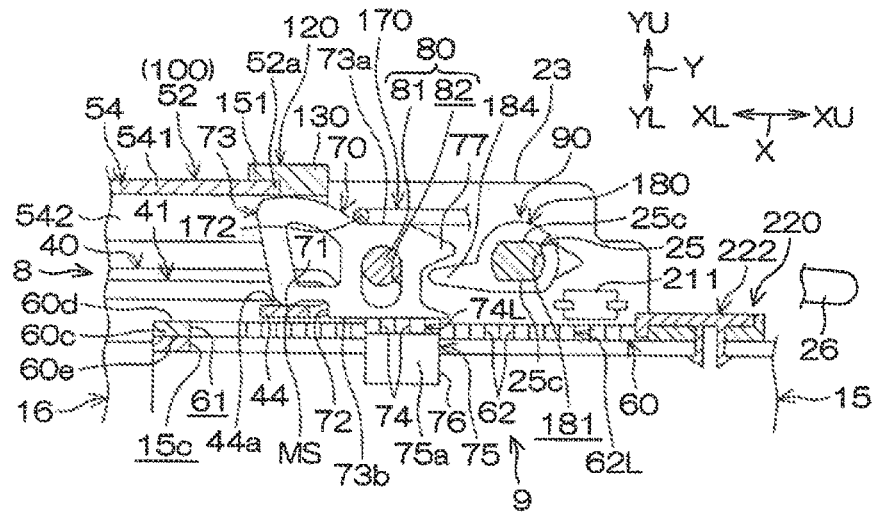
Figure 10B:
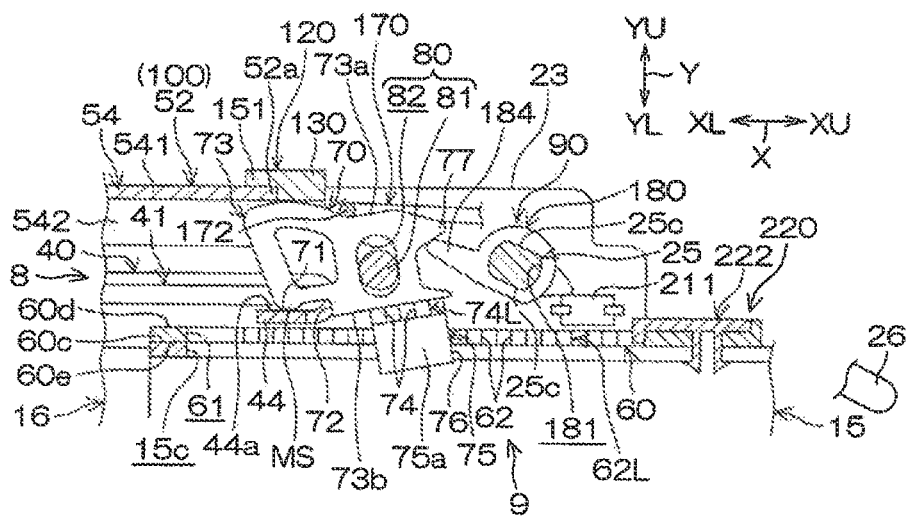

The tooth lock mechanism 9 is a mechanism configured to mesh teeth when a tightening operation is performed by the tightening mechanism 7 so as to stabilize initial holding in a telescopic direction upon a secondary collision (in other words, to keep the telescopic position of the upper jacket 15 in an initial stage of a secondary collision). FIG. 7 is a perspective view of the structure around the tooth lock mechanism 9. FIGS. 10A and 10B are partially cutaway side views of the structure around the tooth lock mechanism 9. FIG. 10A illustrates a locked state. FIG. 10B illustrates an unlocked state.

As illustrated in FIG. 4, FIG. 7, and FIG. 10A, the tooth lock mechanism includes the first tooth member 60, the second tooth member 70, the guide mechanism 80, and the interlock mechanism 90. The first tooth member 60 is described. As illustrated in FIG. 4, the first tooth member 60 is fixed to the flat portion 15b of the outer peripheral surface 15a of the upper jacket 15 by welding or the like. The first tooth member 60 is formed by using a rectangular plate longitudinally extending in the column axis direction X.

The first tooth member 60 has the pair of end faces 60a (see FIG. 3) in the lateral direction Z (tightening axis direction J), an upper end 60b and a lower end 60c (see FIG. 4) in the column axis direction X, and a back surface 60e (see FIG. 3). The back surface 60e is a surface located on the opposite side from a front surface 60d, and extends along the flat portion 15b of the upper jacket 15. As illustrated in FIG. 10A, the first tooth member 60 has a through groove 61 and a pair of first tooth arrays 62L. The through groove 61 passes through the front surface 60d and the back surface 60e, and extends in the column axis direction X. The pair of first tooth arrays 62L are provided in the through groove 61. The upper jacket 15 has a slit 15c communicating with the through groove 61 and extending in the column axis direction X.

As illustrated in FIG. 4 and FIG. 10A, the through groove 61 has a pair of inner wall surfaces extending in the column axis direction X and facing each other in the tightening axis direction J. The pair of first tooth arrays 62L are formed on the pair of inner wall surfaces. The pair of first tooth arrays 62L have a plurality of first teeth 62 arrayed in the column axis direction X. As illustrated in FIG. 4, the tips of the first teeth 62 of the pair of first tooth arrays 62L face each other in the tightening axis direction J. A tooth trace direction D (corresponding to a facewidth direction) of the first teeth 62 extends in a depth direction of the through groove 61 so as to be orthogonal to both of the column axis direction X and the tightening axis direction J.

The guide and restriction surfaces 51 of the guide and restriction mechanism 50 of the energy absorption mechanism 8 are arranged on both sides of the through groove 61 in the lateral direction Z (tightening axis direction J) in the front surface 60d of the first tooth member 60. The first tooth member 60 may be fixed to the outer peripheral surface of the upper jacket 15 with a bolt or the like (not illustrated).

Further, the first tooth member 60 may be formed integrally with the upper jacket 15 by using a single kind of material.

Next, the second tooth member 70 is described. The second tooth member 70 includes a body portion 73 and a tooth formation portion 75. The body portion 73 includes a received portion 71 and a drive portion 72. The tooth formation portion 75 is extended from the body portion 73, and has second teeth 74 formed at a position spaced away from the received portion 71. As illustrated in FIG. 10A, the body portion 73 has a shape of a substantially quadrangular plate in side view (that is, view in the lateral direction Z). The body portion 73 has an upper surface 73a, which is a surface located on the tilt direction upper side YU, a lower surface 73b, which is a surface located on the tilt direction lower side YL, and a pair of side surfaces 73c facing each other in the lateral direction Z (FIG. 4 illustrates one side surface 73c alone). The body portion 73 has a lightening hole 78 that is a through hole passing through the pair of side surfaces 73c.

Figure 11:
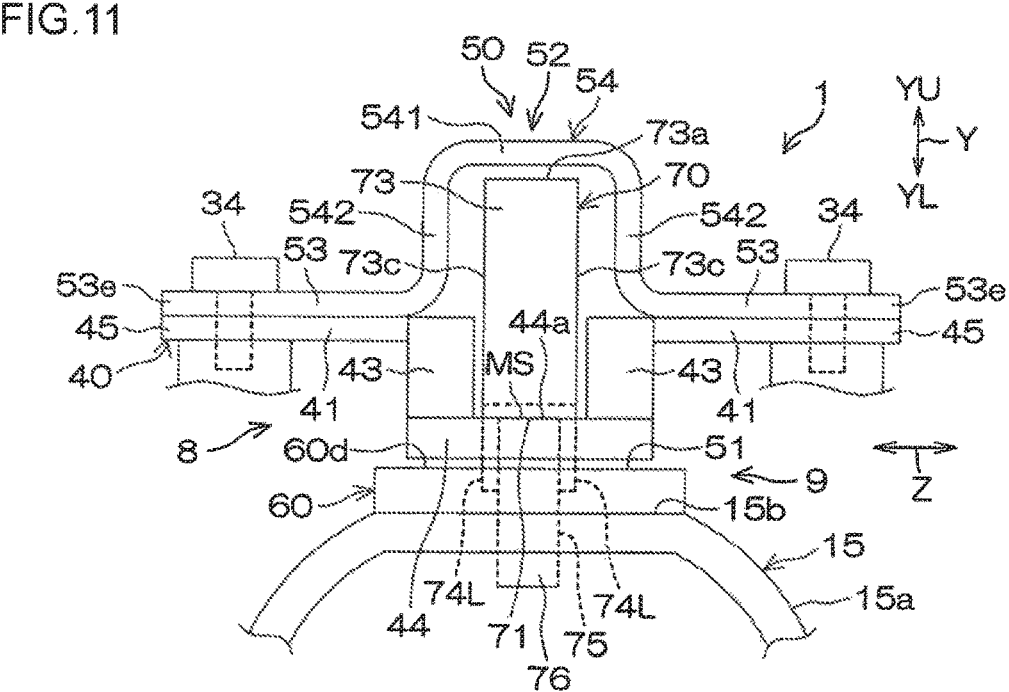
FIG. 11 is a schematic view of the structure around the energy absorption mechanism that is viewed from the lower side in the column axis direction according to the first embodiment.

As illustrated in FIG. 11, a clearance is provided between the upper surface 73a of the body portion 73 and the upper plate 541 of the coupling portion 54 of the guide and restriction member 52. Upon a secondary collision, the upper plate 541 is brought into abutment against the upper surface 73a of the body portion 73, thereby restricting upward displacement of the second tooth member 70 moving to the column axis direction lower side XL. Further, a clearance of a predetermined size is provided between each side surface 73c of the body portion 73 and the corresponding side plate 542 of the coupling portion 54 of the guide and restriction member 52.

As illustrated in FIG. 10A, the received portion 71 is formed of a convex portion provided at the lower end of the lower surface 73b of the body portion 73 in the column axis direction X. As illustrated in FIG. 10A and FIG. 11, the received portion 71 is placed on a receiving surface 44a (corresponding to an upper surface), and is received by the receiving surface 44a. The receiving surface 44a is provided on the movement portion 44 of the energy absorption member 40 that constitutes a receiving member. As illustrated in FIG. 10A, the second tooth member 70 is rotatably supported by a fulcrum MS that is formed on the receiving surface 44a at a contact position between the receiving surface 44a and the received portion 71 and is movable in the column axis direction X.

The drive portion 72 is a stepped portion provided on the lower surface 73b of the body portion 73, and is oriented toward the column axis direction lower side XL. The drive portion 72 is spaced away from the received portion 71 toward the column axis direction upper side XU. The drive portion 72 that is a stepped portion faces, in the column axis direction X, the end face of the movement portion 44 on the column axis direction upper side XU. Upon a secondary collision, the drive portion 72 is brought into abutment against the movement portion 44, thereby pressing the movement portion 44 to move to the column axis direction lower side XL.

The tooth formation portion 75 is a plate member extended so as to protrude from the lower surface 73b of the body portion 73. The tooth formation portion 75 is arranged on the column axis direction upper side XU with respect to the drive portion 72. A pair of side surfaces 75a of the tooth formation portion 75 have a pair of second tooth arrays 74L each having a plurality of second teeth 74 formed in array. FIGS. 4, 10A, and 10B illustrate the second tooth array 74L of one side surface 75a alone.

The tips of the respective second teeth 74 of the pair of second tooth arrays 74L are oriented laterally outward in opposite directions. The second teeth 74 of each second tooth array 74L are meshable with the first teeth 62 of the corresponding first tooth array 62L in the tooth trace direction D. As illustrated in FIG. 10A, the second tooth member 70 includes a plate-like extended portion 76 extended from the tooth formation portion 75 so as to be inserted into the slit 15c of the upper jacket 15. At the time of telescopic adjustment, the extended portion 76 is brought into abutment against the inner surface of the slit 15c, so that the first tooth member 60 and the second tooth member 70 are positioned in the lateral direction Z. Thus, when the first teeth 62 mesh with the second teeth 74, the first teeth 62 and the second teeth 74 are easily aligned with each other.

Next, the guide mechanism 80 is described. As illustrated in FIG. 4 and FIG. 10A, the guide mechanism 80 includes a guide shaft 81 extending in the lateral direction Z, and an elongated hole 82. The elongated hole 82 is formed in the body portion 73 of the second tooth member 70, and the guide shaft 81 is inserted into the elongated hole 82. The guide mechanism 80 guides the second tooth member 70 in a meshing and unmeshing direction. The direction in which the elongated hole 82 extends in side view (view in the lateral direction Z) may be a direction along the tooth trace direction D of the first teeth 62 in a tooth-locked state, or may be a direction inclined to the column axis direction upper side XU or the column axis direction lower side XL from the tooth trace direction D of the first teeth 62.

Figure 8:
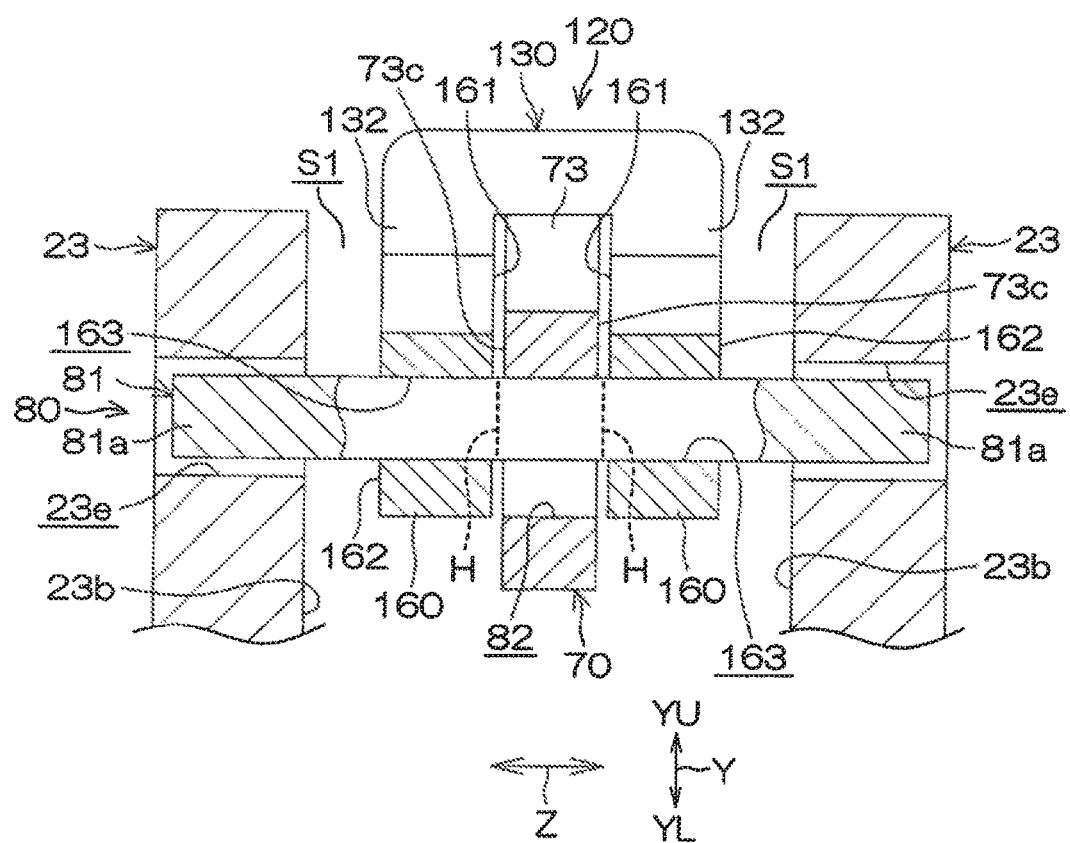
FIG. 8 is a sectional view taken along the line VIII-VIII of FIG. 7, illustrating the structure around a guide shaft to be broken upon a secondary collision.

FIG. 8 is a sectional view taken along the line VIII-VIII of FIG. 7. As illustrated in FIG. 4 and FIG. 7, the guide shaft 81 is supported by a support member 100 that is supported by the lower jacket 16. The support member 100 includes a first support member 110 and a second support member 120. The first support member 110 is constituted by the guide and restriction member 52 of the energy absorption mechanism 8. The second support member 120 is supported by the first support member 110 (corresponding to the guide and restriction member 52). As illustrated in FIG. 7 and FIG. 8, the second support member 120 is arranged between the pair of tightened portions 23.

Figure 9A:
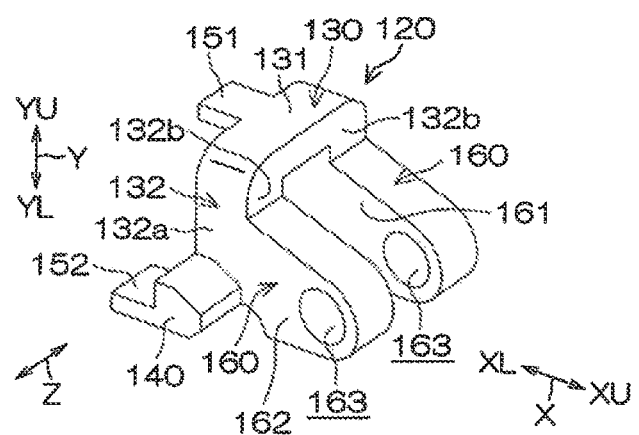
FIG. 9A is a perspective view of a second support member according to the first embodiment.
Figure 9B:
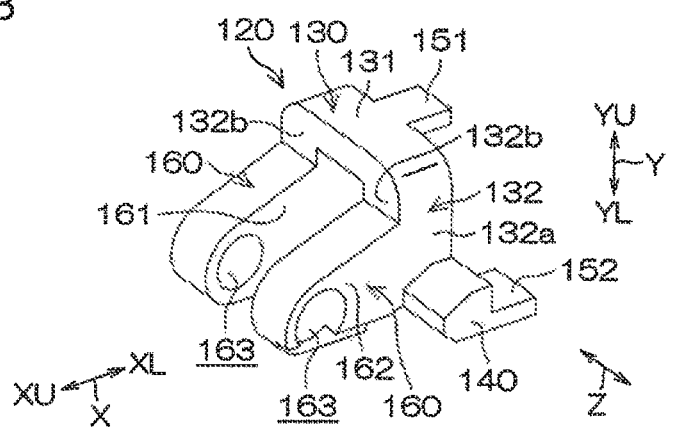
FIG. 9B is a perspective view of the second support member that is viewed at an angle different from the angle in FIG. 9A.
Figure 9C:
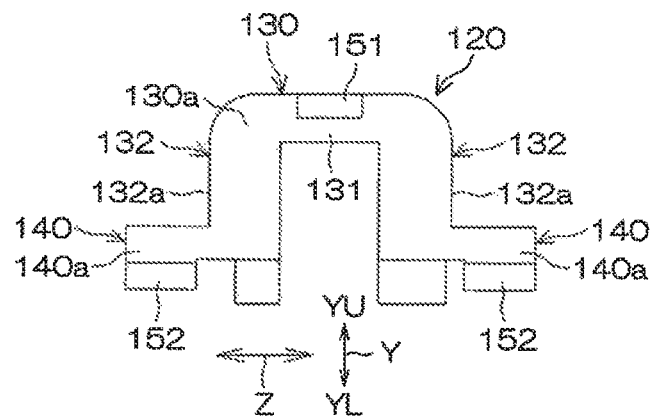
FIG. 9C is a rear view of the second support member (view from a lower side in a column axis direction)

As illustrated in FIG. 5, the guide and restriction member 52 serving as the first support member 110 includes the fixed portions 53e and an extending portion EZ (see FIG. 7). The fixed portions 53e are fixed to the lower jacket 16 at positions on the column axis direction lower side XL with respect to the pair of tightened portions 23. The extending portion EZ extends from the fixed portions 53e to a position where the extending portion EZ is arranged between the pair of tightened portions 23 (that is, to an upper end 52a of the guide and restriction member 52). As illustrated in FIGS. 9A, 9B, and 9C, the second support member 120 includes a body portion 130, a pair of insertion protruding portions 140, a first engagement portion 151, a pair of second engagement portions 152, and a pair of support portions 160. The second support member 120 is formed integrally by using a single kind of material (for example, a synthetic resin).

As illustrated in FIG. 5, the first engagement portion 151 and the second engagement portions 152 engage with the upper end 52a of the guide and restriction member 52 serving as the first support member 110 in the column axis direction X. As illustrated in FIGS. 9A to 9C, the body portion 130 includes an upper frame 131 extending in the lateral direction Z, and a pair of side frames 132. The pair of side frames 132 extend from both ends of the upper frame 131 to the tilt direction lower side YL. The body portion 130 as a whole has an inverted U-shape. Each of the pair of insertion protruding portions 140 is extended so as to protrude from an outer side surface 132*a* of the corresponding side frame 132.

The first engagement portion 151 is extended so as to protrude from the upper frame 131 toward the column axis direction lower side XL. Each of the pair of second engagement portions 152 is extended so as to protrude from a lower part of the corresponding insertion protruding portion 140 (part on the tilt direction lower side YL) toward the column axis direction lower side XL. As illustrated in FIG. 5 and FIG. 9C, an end face 130*a* of the body portion 130 on the column axis direction lower side XL and end faces 140*a* of the pair of insertion protruding portions 140 on the column axis direction lower side XL are brought into abutment against an end face 52*b* of the guide and restriction member 52 on the column axis direction upper side XU. Thus, movement of the second support member 120 in the column axis direction X is restricted.

As illustrated in FIG. 5, the first engagement portion 151 engages with an upper surface 54*a* of the coupling portion 54 in the tilt direction Y (upper surface of the upper plate 541) at the upper end 52*a* of the guide and restriction member 52 in the column axis direction X. The pair of second engagement portions 152 engage with the inner surfaces 53*c*, which are lower surfaces in the tilt direction Y, at the upper ends 53*a* of the pair of guide and restriction plates 53 of the guide and restriction member 52 in the column axis direction X. The first engagement portion 151 and the second engagement portions 152 hold the guide and restriction member 52 therebetween in the tilt direction Y. Thus, movement of the second support member 120 in the tilt direction Y is restricted.

The first engagement portion 151 and the second engagement portions 152 of the second support member 120 frictionally engage with the guide and restriction member 52. With a frictional engagement force, the second support member 120 is positioned in the lateral direction Z relative to the guide and restriction member 52. As illustrated in FIG. 4 support grooves 23*c* are formed at the lower ends of the pair of tightened portions 23 of the lower jacket 16 in the column axis direction X. The support groove 23*c* is open to the column axis direction lower side XL. The support groove 23*c* is also open to the outer side surface 23*a* and the inner side surface 23*b* of the tightened portion 23. The support groove 23*c* is arranged at a higher level in the tilt direction Y than the upper surface 16*d* of the wall portion 16*c*.

As illustrated in FIG. 5, each of the pair of insertion protruding portions 140 is inserted to and supported by the support groove 23*c* of the corresponding tightened portion 23. Each insertion protruding portion 140 is housed in the support groove 23*c* together with the corresponding second engagement portion 152 and the upper end 53*a* of the corresponding guide and restriction plate 53. An inner surface 23*d* of each support groove 23*c* supports the corresponding insertion protruding portion 140 so that the insertion protruding portion 140 is slidable in the tightening direction of the pair of tightened portions 23 and a direction opposite thereto (direction orthogonal to the drawing sheet in FIG. 5, which is the lateral direction Z).

As illustrated in FIGS. 9A and 9B, each of the pair of support portions 160 is extended so as to protrude from an end face 132*b* of the corresponding side frame 132 of the body portion 130 on the column axis direction upper side XU. The pair of support portions 160 are formed of plate-like arms facing and spaced from each other in the lateral direction 7. As illustrated in FIG. 8, the body portion 73 of the second tooth member 70 is arranged between the pair of support portions 160 of the second support member 120 and between the pair of side frames 132 of the second support member 120.

As illustrated in FIG. 9A, the pair of support portions 160 have support holes 163 to which the guide shaft 81 is press-fitted. As illustrated in FIG. 8, a pair of ends 81*a* of the guide shaft 81 in its axial direction are each loosely fitted to a loose-fitting hole 23*e* provided in the corresponding tightened portion 23. That is, the guide shaft 81 is positioned by the second support member 120 that is supported by the guide and restriction member 52 (first support member 110; see FIG. 7). If the guide shaft 81 is displaced at the time of telescopic adjustment, the loose-fitting holes 23*e* illustrated in FIG. 8 regulate the movement amount of the guide shaft 81.

The pair of support portions 160 have a pair of slide guide surfaces 161 and outer side surfaces 162. The pair of slide guide surfaces 161 are inner side surfaces facing each other. The outer side surface 162 faces the inner side surface 23*b* of the corresponding tightened portion 23 via a clearance S1. The size of the clearance S1 is set so that the inner side surface 23*b* of each tightened portion 23 does not interfere with the surfaces of the second support member 120 (outer side surface 132*a* of the side frame 132 and outer side surface 162 of the support portion 160), which face the inner side surface 23*b*, even when the distance between the pair of tightened portions 23 that are tightened at the time of locking operation is reduced. Thus, the second support member 120 and the guide shaft 81 supported by the second support member 120 are not subjected to a load from the tightened portion 23 at the time of locking operation performed by the tightening mechanism 7.

Each of the pair of slide guide surfaces 161 faces the corresponding side surface 73*c* of the body portion 73 of the second tooth member 70. The pair of slide guide surfaces 161 slidably guide, in the meshing and unmeshing direction, the side surfaces 73*c* of the body portion 73 of the second tooth member 70, which face the pair of slide guide surfaces 161, while restricting movement of the second tooth member 70 in the axial direction of the guide shaft 81 (lateral direction Z). The guide shaft 81 is formed of a resin, and is broken upon a secondary collision by a shock load received from the second tooth member 70 while the first teeth 62 and the second teeth 74 mesh with each other. Specifically, the guide shaft 81 is broken at two breakable portions H each arranged at a position between each of the pair of slide guide surfaces 161 and the corresponding side surface 73*c* of the body portion 73 of the second tooth member 70.

Next, the interlock mechanism 90 is described. As illustrated in FIG. 4, the interlock mechanism 90 includes an urging member 170 and a drive member 180. As illustrated in FIG. 10A, the urging member 170 is a spring member configured to rotationally urge the second tooth member 70 supported at the fulcrum MS and guided by the guide mechanism 80 so that the second tooth member 70 meshes with the first tooth member 60. The urging member 170 urges the received portion 71 of the second tooth member 70 so that the received portion 71 is pressed against the receiving surface 44*a* of the movement portion 44 of the energy absorption member 40. The drive member 180 drives the second tooth member 70 against the urging member 170 so that the second tooth member 70 is unmeshed.

As illustrated in FIG. 4, the drive member 180 includes a tubular body portion 182 and a release protrusion 184. The body portion 182 has a fitting hole 181 to which the tightening shaft 25 is inserted and fitted so as to be rotatable together with the body portion 182. The release protrusion 184 protrudes from an outer periphery 183 of the body portion 182. As illustrated in FIG. 10A, a pair of flat portions 25*c* are formed on the outer periphery of the tightening shaft 25. The flat portions 25*c* define a width across flats on the outer periphery of the tightening shaft 25. The inner peripheral surface of the fitting hole 181 has a pair of flat portions engaging with the pair of flat portions 25*c*. The tightening shaft 25 may be fitted to the fitting hole 181 by spline fitting.

As illustrated in FIG. 4 and FIG. 7, the urging member 170 includes a pair of first engagement portions 171, a second engagement portion 172, and a pair of coil portions 173. The pair of first engagement portions 171 engage with the lower jacket 16. The second engagement portion 172 engages with the second tooth member 70. The pair of coil portions 173 surround the outer periphery 183 of the body portion 182 of the drive member 180 at a pair of ends of the body portion 182 in its axial direction. Each of the pair of coil portions 173 has one end 173*a* on the column axis direction upper side XU, and the other end 173*b* on the column axis direction lower side XL.

Each first engagement portion 171 extends orthogonally (laterally outward in the lateral direction Z) from the one end 173*a* of the corresponding coil portion 173, and engages with an engagement recessed portion 23*f* of the corresponding tightened portion 23, which serves as an engagement portion. As illustrated in FIG. 7, the second engagement portion 172 extends orthogonally from the other ends 173*b* of the pair of coil portions 173 so as to couple the other ends 173*b* to each other. As illustrated in FIG. 10A, the second engagement portion 172 engages with the upper surface 73*a* of the body portion 73 of the second tooth member 70.

Along with rotation of the tightening shaft 25 in an unlocking direction, the release protrusion 184 engages with an engagement protrusion 77 serving as an engagement portion provided on the body portion 73 of the second tooth member 70. Thus, the release protrusion 184 rotationally displaces the second tooth member 70 against the urging member 170 so that the second tooth member 70 is unmeshed. When the operation lever 26 is operated to rotate in a locking direction (counterclockwise in FIG. 10B), the drive member 180 together with the tightening shaft 25 are caused to rotate counterclockwise so as to achieve a state illustrated in FIG. 10A from a state illustrated in FIG. 10B.

Thus, the release protrusion 184 of the drive member 180 disengages from the engagement protrusion 77 of the second tooth member 70. Therefore, the urging member 170 drives the second tooth member 70 to rotate clockwise about the fulcrum MS, so that the second teeth 74 mesh with the first teeth 62 in the tooth trace direction D (see FIG. 10A). In this manner, a telescopic lock using the tooth lock is achieved.

When the operation lever 26 is reversely operated to rotate in the unlocking direction (clockwise in FIG. 10A), the drive member 180 together with the tightening shaft 25 are caused to rotate clockwise so as to achieve the state illustrated in FIG. 10B from the state illustrated in FIG. 10A. Thus, the release protrusion 184 of the drive member 180 pushes up the engagement protrusion 77 of the second tooth member 70. Therefore, the second tooth member 70 is driven to rotate counterclockwise about the fulcrum MS, so that the second teeth 74 are unmeshed by being brought away from the first teeth 62 along the tooth trace direction D (see FIG. 10B). In this manner, the telescopic lock using the tooth lock is released.

As illustrated in FIG. 4, the steering system 1 includes a first regulating mechanism 210 and a second regulating mechanism 220. The first regulating mechanism 210 and the second regulating mechanism 220 regulate a pair of terminal end positions in a movement range of the upper jacket 15 at the time of telescopic adjustment. The first regulating mechanism 210 regulates the position of the upper jacket 15 in the column axis direction X when the upper jacket 15 is located at a longest position where the upper jacket 15 protrudes most from the lower jacket 16. The second regulating mechanism 220 regulates the position of the upper jacket 15 in the column axis direction X when the upper jacket 15 is located at a shortest position where the upper jacket 15 retracts most into the lower jacket 16.

The first regulating mechanism 210 includes a first stopper 211 and a first engagement portion 212. The first stopper 211 is held by the other tightened portion 23 of the lower jacket 16. The first engagement portion 212 is provided integrally with the first tooth member 60, and engages with the first stopper 211 while the upper jacket 15 is located at the longest position. The first engagement portion 212 is a rectangular parallelepiped block that is formed integrally so as to protrude from the front surface 60*d* of the first tooth member 60.

The first stopper 211 is held so as to be inserted into a holding hole 23*g* passing through the other tightened portion 23 in the lateral direction Z. A part of the first stopper 211 protrudes from the inner side surface 23*b* of the other tightened portion 23, and is brought into sliding contact with the front surface 60*d* of the first tooth member 60 at the time of telescopic adjustment. Although illustration is omitted, at least a part of the first stopper 211 includes a conductive member, and is held in contact with the inner side surface 19*b* of the side plate 19 in an electrically conductive manner. Further, the first stopper 211 is held in contact with the upper jacket 15 in an electrically conductive manner via the first tooth member 60. Thus, the upper jacket 15 and the lower jacket 16 are connected to each other in an electrically conductive manner via the first stopper 211 and the first tooth member 60.

In the steering system 1, it is necessary to secure a conductive path so as to establish electric conduction to the vehicle body 2 from a horn (not illustrated) mounted on the steering member 10. However, grease (having insulating properties) is applied in many cases between the upper jacket 15 and the lower jacket 16 and between the lower jacket 16 and the side plate 19 so as to make a smooth slide between those members at the time of tilt adjustment or telescopic adjustment. In this case, it is difficult to set a conductive path between those members.

Therefore, in this embodiment, the conductive member (first stopper 211) provided in contact with the conductive portion (first tooth member 60) on the upper jacket 15 and with the side plate 19. Thus, a conduct path from the steering member 10 to the vehicle body sequentially via the steering shaft 3, the upper jacket 15 the conductive member (first stopper 211), and the upper bracket 6 can be secured with excellent assembling workability. Further, the first stopper 211 is held in the holding hole 23*g*, which inhibits an increase in size of the steering system 1 and saves space.

The second regulating mechanism 220 includes a second stopper 221 and a second engagement portion 222. The second stopper 221 is provided on the second tooth member 70. The second engagement portion 222 is fixed to the first tooth member 60, and engages with the second stopper 221 while the upper jacket 15 is located at the shortest position. Upon a secondary collision, the upper jacket 15 moves to the column axis direction lower side XL relative to the lower jacket 16. At this time, the second tooth member 70 meshing with the first tooth member 60 that moves together with the upper jacket 15 applies an impact force to the guide shaft 81 supported by the second support member 120.

Figure 12:
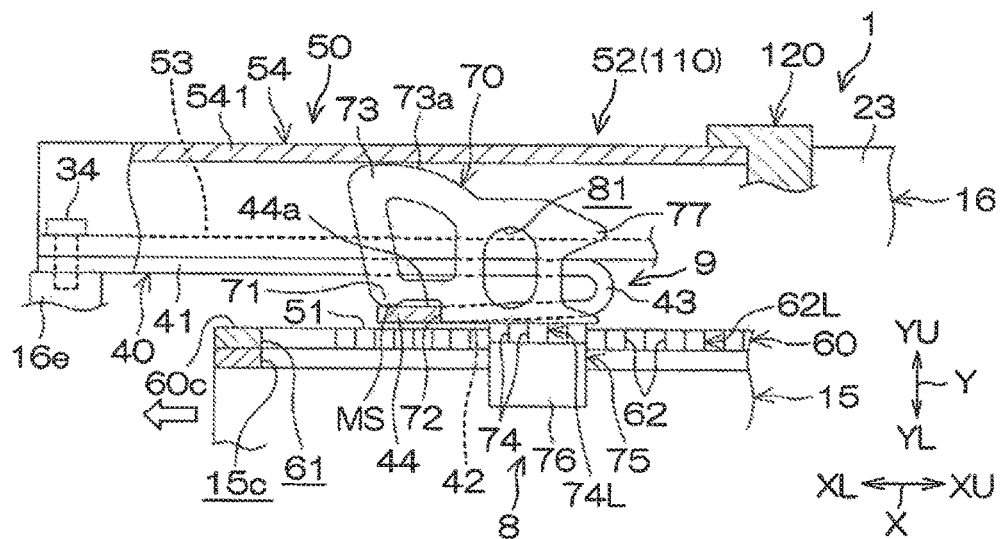
FIG. 12 is a schematic partially cutaway side view of the energy absorption mechanism upon a secondary collision according to the first embodiment.

Therefore, the guide shaft 81 is broken at the two breakable portions H illustrated in FIG. 8. Along with the breakage of the guide shaft 81, the second tooth member 70 is no longer supported by the second support member 120, and moves to the column axis direction lower side XL together with the upper jacket 15 while being kept meshing with the first tooth member 60 as illustrated in FIG. 12. Thus, the movement portion 44 of the energy absorption member 40 is pressed by the drive portion 72 of the second tooth member 70 to move to the column axis direction lower side XL.

Along with the movement of the movement portion 44, the energy absorption member 40 deforms while shifting the positions of the folded portions 43 to the column axis direction lower side XL so that the length of the first plate portions 41 decreases and the length of the second plate portions 42 increases in the column axis direction X. Through the deformation, energy generated along with the secondary collision is absorbed. Upon the secondary collision, the guide and restriction plates 53 of the guide and restriction member 52 guide folding deformation caused in a range from the first plate portions 41 to the folded portions 43 while restricting upward displacement of the first plate portions 41. Upon the secondary collision, the guide and restriction surfaces 51 on the front surface 60d of the first tooth member 60 guide deformation caused in a range from the folded portions 43 to the second plate portions 42 so that the second plate portions 42 are substantially parallel to the first plate portions 41 while restricting a bulge of the second plate portions 42 between the folded portions 43 and the movement portion 44. In other words, deformation and movement of the energy absorption member 40 are guided between the guide and restriction plates 53 of the guide and restriction member 52 and the guide and restriction surfaces 51 on the first tooth member 60.

The upper plate 541 of the coupling portion 54 of the guide and restriction member 52 guides the upper surface 73a of the body portion 73 of the second tooth member 70 to the column axis direction lower side XL. The guide and restriction surfaces 51 of the first tooth member 60 guide, to the column axis direction lower side XL, the movement portion 44 that receives the received portion 71 of the second tooth member 70. Thus, movement of the second tooth member 70 to the column axis direction lower side XL is guided.

In this embodiment, as illustrated in FIG. 10A, the second tooth member 70 is rotatably supported by the fulcrum MS that is formed at the contact position between the receiving surface 44a of the receiving member (energy absorption member 40) and the received portion 71 of the second tooth member 70 and that is movable in the column axis direction X. Therefore, the movable fulcrum MS can be formed by placing the received portion 71 of the second tooth member 70 on the receiving surface 44a of the receiving member (energy absorption member 40) during assembling. Thus, there is no need to perform cumbersome work as in the related art, in which a support shaft that is a rotation center of a tooth member is inserted into support holes. As a result, the assembling workability is improved.

The energy absorption member 40 serves also as the receiving member, and therefore the structure can be simplified. As illustrated in FIG. 8, the guide shaft 81 to be broken upon a secondary collision is supported by the pair of support portions 160 of the second support member 120 while being spaced away from the pair of tightened portions 23 to be tightened and displaced in the lateral direction Z by the tightening mechanism 7. The pair of support portions 160 are provided on the second support member 120 that is supported by the extending portion EZ extending from the fixed portions 53e fixed to the lower jacket 16 at the positions on the column axis direction lower side XL with respect to the pair of tightened portions 23 as illustrated in FIG. 5 to the space between the pair of tightened portions 23 as illustrated in FIG. 7.

Figure 13:
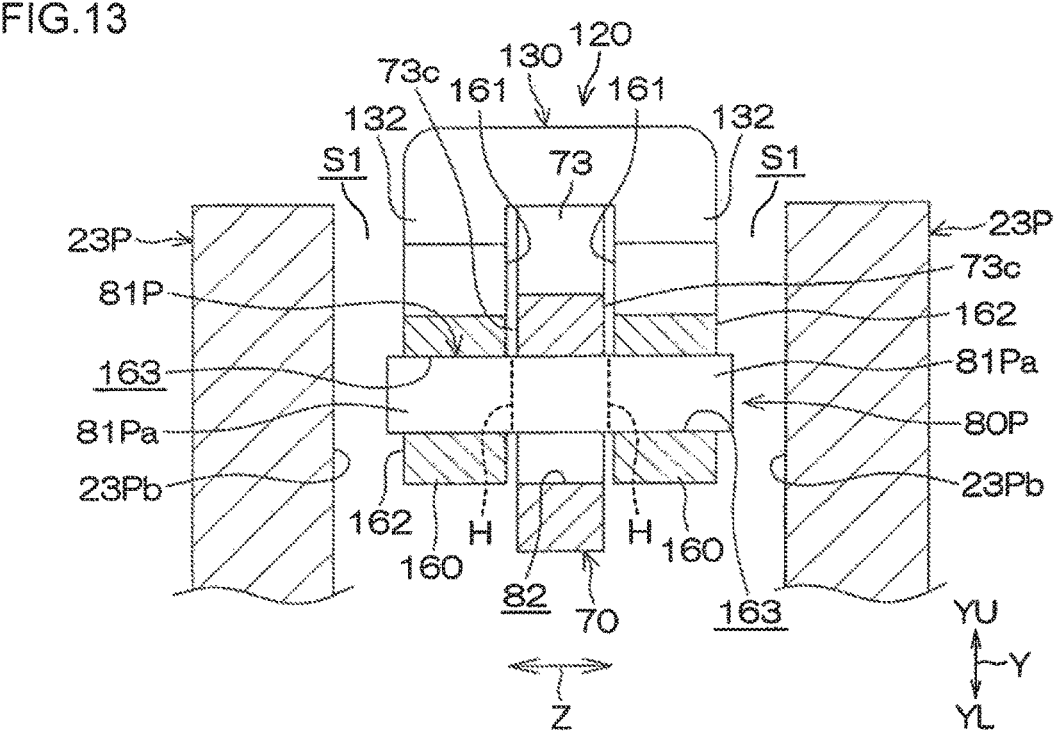
FIG. 13 is a schematic sectional view of a guide mechanism according to a second embodiment of the present invention, illustrating the structure around a guide shaft to be broken upon a secondary collision.

Therefore, upon a secondary collision, the guide shaft 81 is broken by a stable breaking load with a load applied from the pair of support portions 160 that are not affected by variation of displacement of the pair of tightened portions 23. Thus, stable energy absorption characteristics can be exerted upon a secondary collision. The pair of support portions 160 have the pair of slide guide surfaces 161 configured to slidably guide the pair of side surfaces 73c of the body portion 73 of the second tooth member 70. Upon a secondary collision, movement of the second tooth member 70 in the axial direction of the guide shaft 81 is restricted by the slide guide surfaces 161 of the pair of support portions 160. Therefore, the guide shaft 81 is broken by a more stable breaking load upon a secondary collision. Thus, stable energy absorption characteristics can be exerted upon a secondary collision. FIG. 13 is a schematic sectional view of a guide mechanism 80P according to a second embodiment of the present invention, illustrating the structure around a guide shaft 81P. The guide mechanism 80P of the second embodiment in FIG. 13 is mainly different from the guide mechanism 80 of the first embodiment in FIG. 8 as follows.

Figure 14:
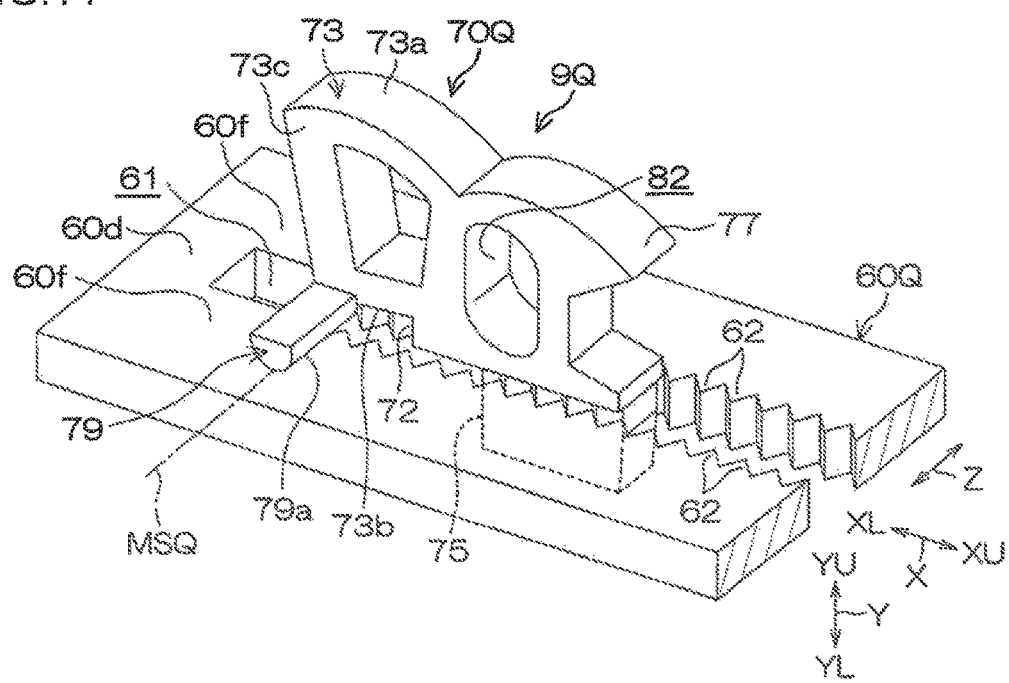
FIG. 14 is a schematic perspective view of a tooth lock mechanism according to a third embodiment of the present invention.

That is, in the guide mechanism 80P of the second embodiment, a pair of tightened portions 23P have no loose-fitting holes to which the guide shaft 81P is loosely fitted. Each end 81Pa of the guide shaft 81P faces a corresponding inner side surface 23Pb of the pair of tightened portions 23P with a predetermined distance therebetween in an axial direction of the guide shaft 81P (lateral direction Z). Components of the second embodiment in FIG. 13 that are identical to the components of the first embodiment in FIG. 8 are represented by the same reference symbols as the reference symbols of the components of the first embodiment in FIG. 8. In this embodiment, there is no need to provide loose-fitting holes in the pair of tightened portions 23P, and therefore the structure can be simplified. FIG. 14 is a schematic perspective view of a tooth lock mechanism 9Q according to a third embodiment of the present invention. The third embodiment in FIG. 14 is mainly different from the first embodiment in FIG. 10A as follows. That is, in the first embodiment in FIG. 10A, the received portion 71 provided on the lower surface 73b of the body portion 73 of the second tooth member 70 is received by the receiving surface 44a (of the movement portion 44) of the energy absorption member 40 serving as the receiving member, so that the fulcrum MS is formed on the receiving surface 44a.

In the third embodiment in FIG. 14, a pair of receiving surfaces 60f are arranged on both sides of the through groove 61 in the lateral direction Z in the front surface 60d of a first tooth member 60Q serving as the receiving member. A pair of support arms 79 each having a semicircular shape in cross section are provided so as to protrude laterally (in the lateral direction Z) from both the side surfaces 73c of the body portion 73 of a second tooth member 70Q (FIG. 14 illustrates one support arm 79 alone). On the peripheral surface of each support arm 79, a convex received portion 79a received by the corresponding receiving surface 60f is provided. On the receiving surface 60f, a fulcrum MSQ movable in the column axis direction X is formed at a contact position between the receiving surface 60f and the received portion 79a.

Figure 15:
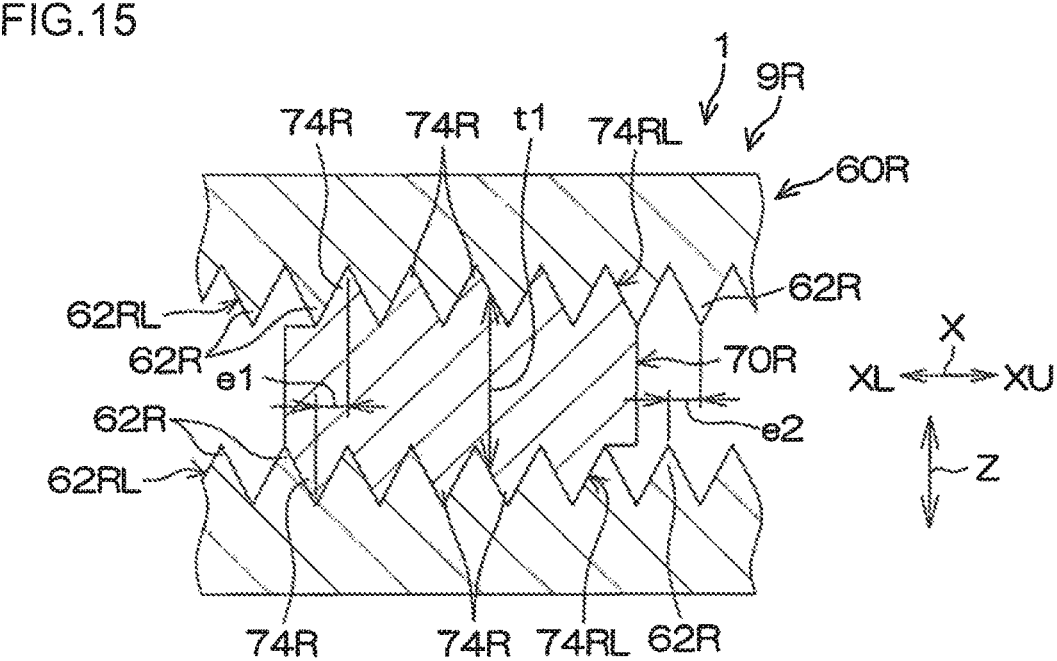
FIG. 15 is a schematic sectional view of a tooth lock mechanism according to a fourth embodiment of the present invention.

Components of the third embodiment in FIG. 14 that are identical to the components of the first embodiment in FIG. 4 to FIG. 10A are represented by the same reference symbols as the reference symbols of the components of the first embodiment in FIG. 4 to FIG. 10A. Also in this embodiment, the same effects as those of the first embodiment can be attained. Further, this embodiment is not limited by the condition that the receiving member be constituted by the energy absorption member 40. Thus, the position of the energy absorption member 40 can be changed or the energy absorption member 40 can be omitted. Accordingly, the degree of freedom in terms of mounting of the energy absorption member 40 is high. FIG. 15 is a schematic sectional view of a tooth lock mechanism 9R according to a fifth embodiment of the present invention, illustrating a state in which a first tooth member 60R meshes with a second tooth member 70R.

As illustrated in FIG. 15, in a pair of second tooth arrays 74RL of the second tooth member 70R, the tips of second teeth 74R of one second tooth array 74RL and the tips of second teeth 74R of the other second tooth array 74RL are offset in the column axis direction X by an offset amount e1 smaller than a tooth pitch. The respective tooth pitches of the second tooth arrays 74RL are set equal to each other.

In a pair of first tooth arrays 62RL of the first tooth member 60R, the tips of first teeth 62R of one first tooth array 62RL and the tips of first teeth 62R of the other first tooth array 62RL are offset in the column axis direction X by an offset amount e2 equal to the offset amount e1 of the second tooth arrays 74RL. The respective tooth pitches of the first tooth arrays 62RL are set equal to each other.

In this embodiment, when the second tooth member 70R is shifted from an unlocked state to a locked state, the second teeth 74R of the second tooth member 70R are aligned with the first teeth 62R of the mating first tooth member 60R with intervals each smaller than the tooth pitch in the column axis direction X. Therefore, the occurrence of a tooth-on-tooth state can be reduced. Further, the tips of the second teeth 74R of the one second tooth array 74RL and the tips of the second teeth 74R of the other second tooth array 74RL are offset by the offset amount e1. Therefore, variation of a thickness t1 of the second tooth member 70R in the lateral direction Z depending on the position in the column axis direction X can be reduced. Thus, the density of the second tooth member 70R is stabilized when the second tooth member 70R is formed of a sintered compact. This is because the compressibility of each part is substantially uniform at the time of sintering (pressure molding). Through the stabilization of the density of the second tooth member 70R, the strength of the second teeth 74R of the second tooth member 70R can be improved.

The present invention is not limited to the embodiments described above. For example, the second support member 120 may be omitted and the guide shaft may be supported by a pair of support portions provided on the extending portion EZ of the guide and restriction member 52. Further, the present invention is applicable not only to a manual steering system in which the steering of the steering member 10 is not assisted but also to an electric power steering system in which the steering of the steering member 10 is assisted by applying power of an electric motor to the steering shaft 3.

In addition, various modifications may be made within the scope of the invention.

What is claimed is:

1. A steering system, comprising:
    a steering shaft extensible and contractible in a column axis direction;
    a column jacket including:
        a lower jacket; and
        an upper jacket fitted to the lower jacket,
        the column jacket supporting the steering shaft such that the steering shaft is rotatable and being extensible and contractible in the column axis direction;
    a first tooth member having a plurality of first teeth arrayed in the column axis direction and being movable together with the upper jacket;
    a receiving member provided on one of the upper jacket and the lower jacket and having a receiving surface;
    a second tooth member including:
        a received portion received by the receiving surface; and
        second teeth spaced away from the received portion and configured to achieve a telescopic lock by meshing with the first teeth,
        the second tooth member being rotatably supported by a fulcrum that is formed on the receiving surface at a contact position between the receiving surface and the received portion and that is movable in the column axis direction;
    a support member supported by the lower jacket; and
    a guide mechanism including:
        a guide shaft supported by the support member and extending in a direction orthogonal to the column axis direction; and
        an elongated hole formed in the second tooth member with the guide shaft inserted into the elongated hole,
        the guide mechanism being configured to guide the second tooth member in a meshing and unmeshing direction.

2. The steering system according to claim 1, wherein the receiving member includes an energy absorption member including:
    a fixed portion fixed to the lower jacket; and
    a movement portion movable to a lower side in the column axis direction together with the upper jacket upon a secondary collision,
    the energy absorption member being deformable along with movement of the movement portion.

3. The steering system according to claim 1, wherein
    the lower jacket includes:
        a slit extending in the column axis direction; and
        a pair of tightened portions arranged on both sides of the slit,
    the steering system further includes a tightening mechanism configured to tighten the lower jacket onto the upper jacket by reducing a distance between the pair of tightened portions,
    the support member includes:
        a fixed portion fixed to the lower jacket at a position on a lower side in the column axis direction with respect to the pair of tightened portions;
        an extending portion extending from the fixed portion to a position where the extending portion is arranged between the pair of tightened portions; and
        a pair of support portions provided on the extending portion or a member supported by the extending portion and configured to support the guide shaft on both sides of the second teeth while being spaced away from the pair of tightened portions, and
    the guide shaft is configured to be broken upon the secondary collision by a shock load received from the second tooth member while the first teeth and the second teeth mesh with each other.

4. The steering system according to claim 2, wherein the lower jacket includes:
   a slit extending in the column axis direction; and
   a pair of tightened portions arranged on both sides of the slit,
   the steering system further includes a tightening mechanism configured to tighten the lower jacket onto the upper jacket by reducing a distance between the pair of tightened portions,
   the support member includes:
   a fixed portion fixed to the lower jacket at a position on a lower side in the column axis direction with respect to the pair of tightened portions;
   an extending portion extending from the fixed portion to a position where the extending portion is arranged between the pair of tightened portions; and
   a pair of support portions provided on the extending portion or a member supported by the extending portion and configured to support the guide shaft on both sides of the second teeth while being spaced away from the pair of tightened portions, and
   the guide shaft is configured to be broken upon the secondary collision by a shock load received from the second tooth member while the first teeth and the second teeth mesh with each other.

5. The steering system according to claim 1, wherein a pair of support portions include a pair of slide guide surfaces configured to slidably guide, in the meshing and enmeshing direction, side surfaces of the second tooth member, which face the pair of slide guide surfaces, while restricting movement of the second tooth member in an axial direction of the guide shaft.

6. The steering system according to claim 2, wherein a pair of support portions include a pair of slide guide surfaces configured to slidably guide, in the meshing and unmeshing direction, side surfaces of the second tooth member, which face the pair of slide guide surfaces, while restricting movement of the second tooth member in an axial direction of the guide shaft.

7. The steering system according to claim 3, wherein the pair of support portions include a pair of slide guide surfaces configured to slidably guide, in the meshing and unmeshing direction, side surfaces of the second tooth member, which face the pair of slide guide surfaces, while restricting movement of the second tooth member in an axial direction of the guide shaft.

8. The steering system according to claim 4, wherein the pair of support portions include a pair of slide guide surfaces configured to slidably guide, in the meshing and unmeshing direction, side surfaces of the second tooth member, which face the pair of slide guide surfaces, while restricting movement of the second tooth member in an axial direction of the guide shaft.

* * * * *